United States Patent Office 3,343,477
Patented Sept. 26, 1967

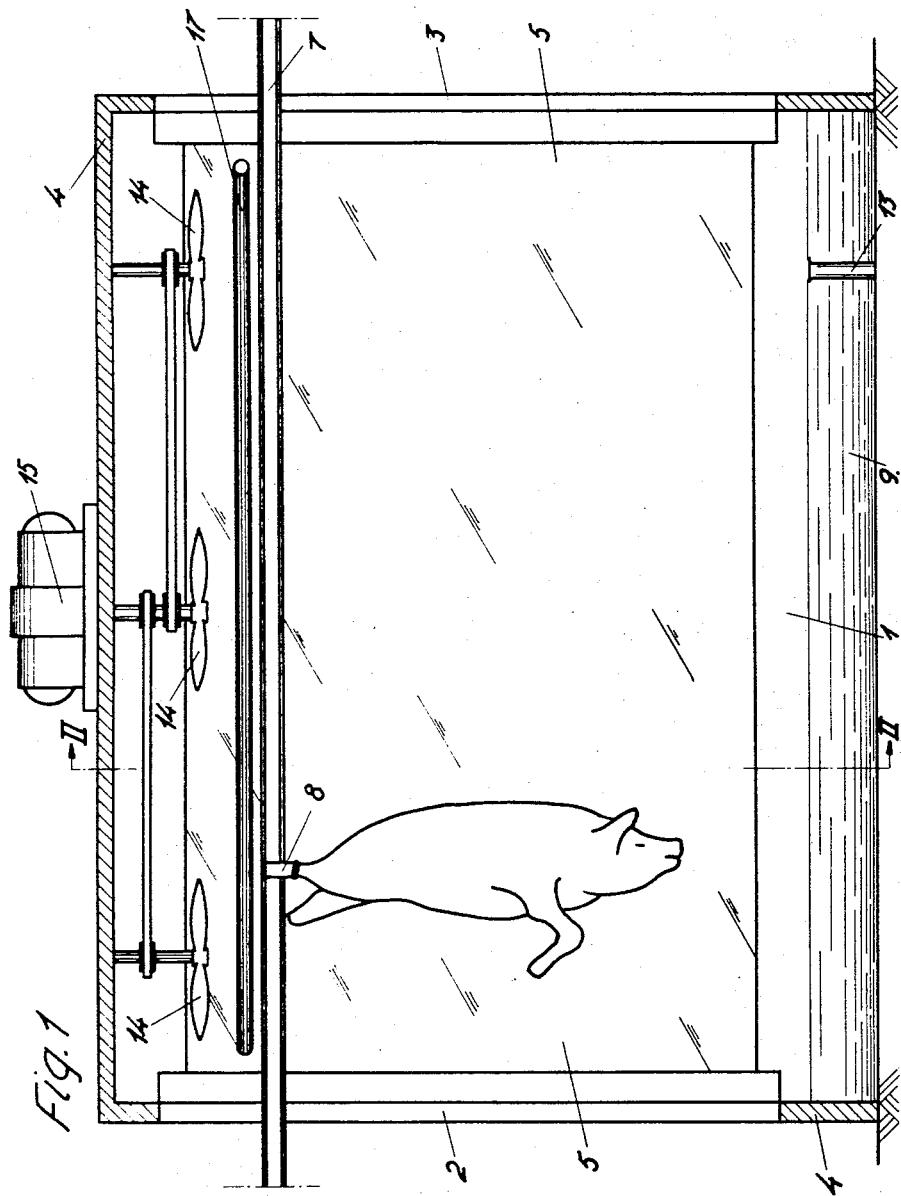

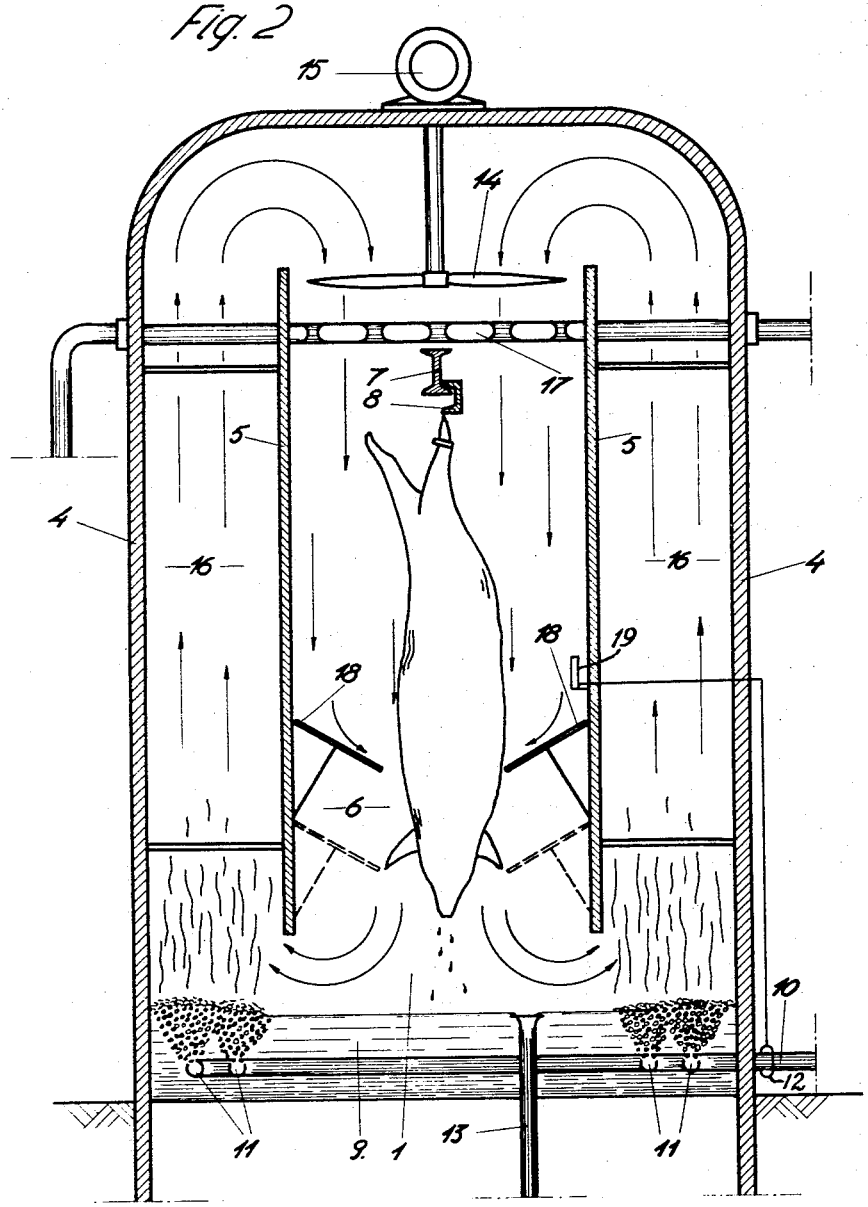

3,343,477
ARRANGEMENT IN APPARATUS FOR HOT WATER TREATMENT OF GOODS
Martin Rudolf Ekstam, Ekestad,
Fjalkestad, Sweden
Filed Sept. 27, 1965, Ser. No. 490,593
Claims priority, application Sweden, Sept. 30, 1964, 11,724/64
2 Claims. (Cl. 99—234)

The present invention refers to an arrangement in apparatus for hot water treatment of goods in a heat insulated treatment chamber while continuously transporting the goods through the chamber, more particularly apparatus for scalding slaughtered animals, such as poultry and pigs, or boiling foodstuffs and other animal or vegetable products requiring a carefully adjusted time of treatment.

In prior apparatus of the kind indicated above, particularly for scalding slaughtered animal bodies, the treatment chamber is adapted for supplying wet steam at the bottom of the chamber and sucking the steam upwards towards the top of the chamber, the steam gradually condensing on the slaughtered animal bodies transported through the chamber in a suspended position and the condensate flowing back downwards into a collection pan. It has been found that it is not possible to attain a satisfactory scalding of the animal bodies in these apparatus. A main reason of this is that the slaughtered animals show differences between the individuals in respect of the necessary scalding time. While the scalding time (at a certain suitable temperature) of a pig easy to scald is for example 8 minutes, for a pig difficult to scald it may amount to 10–11 minutes. If the speed at which the slaughtered animals are transported through the treatment chamber is adjusted so that the individuals most difficult to scald get the right time of scalding, the individuals more easy to scald will be damaged owing to an excessive time of scalding. The tolerance range of time, i.e. the excess of scalding time that a slaughtered animal may stand without being damaged, is quite short, of the magnitude of 10 seconds, and this period of time will thus be exceeded many times over. Further, if it is assumed that the wet steam entering the treatment chamber at the bottom thereof has a temperature adjusted so that the uppermost part of the suspended slaughtered animals will get the right amount of scalding during the time the transport through the treatment chamber takes, the lowermost part (the head) of the slaughtered animals will be too heavily scalded.

The principal object of the invention is to provide an arrangement by which the abovementioned drawbacks are avoided. This arrangement is substantially characterized by the fact that it includes blower means disposed in the upper part of the treatment chamber for blowing a current of air mixed with wet steam downwards through the chamber, and cooling means disposed in the path of this current for condensing the steam before, as a mist, it encounters goods transported through the chamber. It has been found that in scalding slaughtered animal bodies with this mist, which substantially consists of already condensed water and only in a quite small proportion of steam, the tolerance range of time becomes considerably much longer than in the case of scalding with steam, amounting as it does to as much as about 12 minutes. A pig body for which the right time of scalding is 8 minutes may thus be subjected to the mist of condensed water spraying down for nearly as much as 20 minutes without being damaged. This period of time will be quite enough even for the pig bodies more difficult to scald, for which the minimum sufficient time of treatment may be from 10 to 11 minutes. While the mist of condensed steam flows downwards along the pig body, its temperature will sink slightly, and if the temperature of the mist, when it first encounters the pig body, is adjusted so that the scalding operation is completed after 8 minutes, longer time is needed for the scalding of the lowermost part. The tolerance range of time allows of such a prolongation without the uppermost part of the pig body being damaged.

In the following the invention will be described more closely with reference to the accompanying drawings, which show an apparatus in which the arrangement according to the invention has been incorporated, for scalding large slaughtered animal bodies, in the first place pig bodies. FIG. 1 shows the apparatus in a vertical longitudinal section, and FIG. 2 shows it in a vertical transverse section.

The apparatus consists of closed chamber 1 which at its ends has entrance and exit openings 2 and 3, respectively, capable of being closed. The chamber 1 has insulating outer walls 4 which at the top merge into an arched roof and, parallel with but spaced inwardly of these walls, likewise insulated inner walls 5. The latter define the treatment chamber 6 proper through which the goods to be treated (scalded or boiled) is advanced continuously from the entrance to the exit opening. The inner walls 5 terminate at a distance from the bottom and ceiling of the chamber 1, so that the treatment chamber 6 defined between them is open at the bottom and at the top.

The chamber 1 is traversed in the longitudinal direction by a beam 7 which forms a suspension rail for the transport of slaughtered animal bodies through the chamber by generally known suspension means 8 which run on the beam and in which the animal bodies may be hung up.

At the bottom of the chamber 1 it forms a pan 9 for water, and a steam pipe 10 for the supply of steam enters this pan and there forms perforated pipe coils 11. The steam supply is controlled by a regulator 12 which comprises a sensing element 19 disposed in the treatment chamber 6. An overflow pipe 13 is provided for limiting the water level in the pan 9.

The apparatus is provided with a fan or blower device disposed in the upper part of the chamber 1 and diagrammatically shown in the drawings as a number of propeller fans 14 which are located between the upper ends of the inner walls 5, i.e. in the uppermost part of treatment chamber 6. The fans are driven by a motor 15 mounted on top of the roof of the chamber 1 in such direction that they draw air mixed with wet steam up through the spaces 16 between the outer walls 4 and the inner walls 5 and blow this mixture of air and steam downwards in the treatment chamber, as is indicated by the arrows in FIG. 2. Below the fans 14 there is provided a cooling element 17 extending across the cross-section of the treatment chamber 6 and consisting of a pipe coil through which a flow of cold water or other cooling liquid takes place.

On the inside of the inner walls 5 there are mounted baffles 18 which are movable vertically and adjustable at various angles to the walls to direct the downward flow of air and water in a path which fairly closely conforms to the outer configuration of the slaughtered animal bodies.

At the employment of the apparatus described above for scalding slaughtered animal bodies these pass continuously through the treatment chamber 6 along the suspension rail 7 immediately under the cooling element 17. Steam is introduced into the pan 9 through the steam pipe 10 and is sucked through the volume of water in the pan together with an air current up through the spaces 16 and is blown down into the treatment chamber by the blower device 14, 15. The current of air and wet steam passes the cooling element 17, the major part of the steam being then condensed to a hot wet mist which flows down across the animal bodies and scalds them. The condensation of the steam is accordingly substantially completed, before the current of air and steam encounters the animal bodies. Thereby the tolerance in scalding time mentioned in the introduction, which is prolonged many times as compared with scalding by steam, is obtained. The extent of scalding may be adjusted to that most suitable in each individual case by controlling the temperature of the steam supplied and the temperature of the cooling liquid. The condensate flows down into the pan 9, in which the water level is kept constant by means of the overflow 13, and the air returns to the spaces 16 by passing under the bottom edges of the inner walls 5.

As already mentioned, the apparatus may also be used for boiling food-stuffs and other products. The procedure is the same as in the case of scalding, although many products which cannot be suspended directly from the suspension rail 7 have to be transported on suitable supports.

What I claim is:

1. In an apparatus for hot water treatment of goods, a heat insulated chamber having entrance and exit openings at two opposite ends, means in said chamber for transporting the goods to be treated from the entrance to the exit end of said chamber, means for producing a mixture of air and wet steam in said chamber, means for blowing said mixture downwards through said chamber from the top to the bottom thereof and cooling means provided in the path of flow of said mixture for condensing the steam to a mist of hot water before encountering the goods transported through the chamber.

2. In an apparatus for hot water treatment of goods, outer walls defining a closed chamber, said chamber having entrance and exit openings at two opposite ends, two parallel heat insulating inner walls spaced within said outer walls and defining an inner treatment chamber, means in said closed chamber for transporting the goods to be treated from the entrance to the exit end of said chamber, means for producing a mixture of air and wet steam at the bottom of said closed chamber, means for drawing said mixture upwards through the spaces between said outer and inner walls and blowing it downwards through said inner treatment chamber from the top to the bottom thereof, and cooling means provided in the path of flow of said mixture at the top of said inner chamber for condensing the steam to a mist of hot water before encountering the goods transported through said inner chamber.

References Cited

UNITED STATES PATENTS

| | | | |
|---|---|---|---|
| 2,207,452 | 7/1940 | Bingman | 134—107 |
| 2,419,119 | 4/1947 | Christensen | 99—234 |
| 2,422,194 | 6/1947 | Harrington | 99—234 |
| 2,839,409 | 6/1958 | Matlen | 99—443 X |
| 2,895,164 | 7/1959 | Murphy | 99—107 |
| 2,948,619 | 8/1960 | Ashley | 99—347 |
| 3,119,145 | 1/1964 | Weprin | 99—107 |
| 3,135,016 | 6/1964 | Ekstam | 17—15 |

WALTER A. SCHEEL, *Primary Examiner.*

R. W. JENKINS, *Assistant Examiner.*